2,439,612

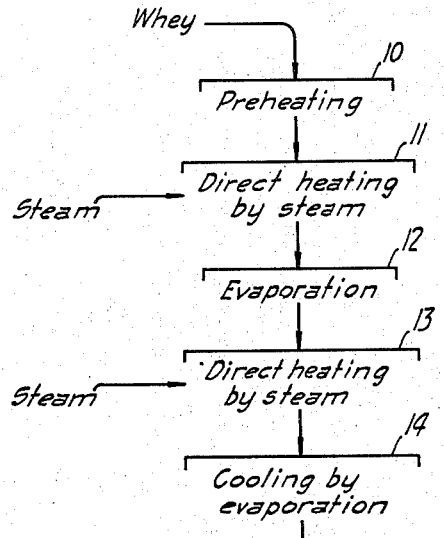
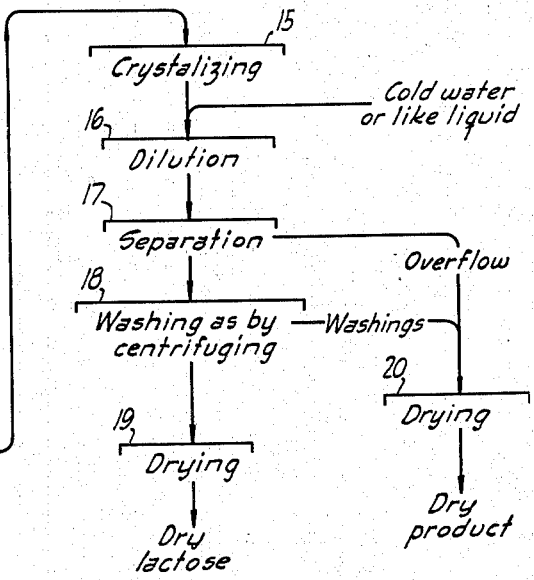
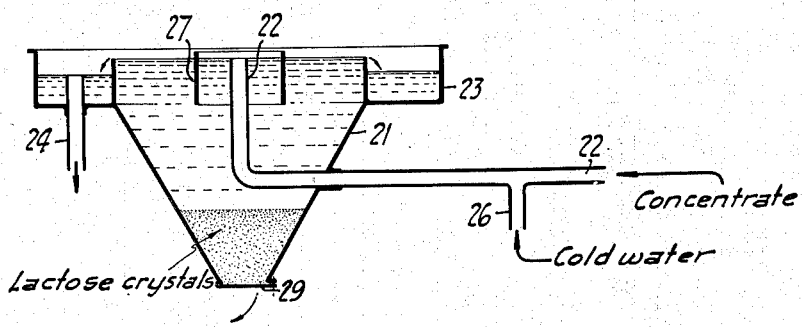

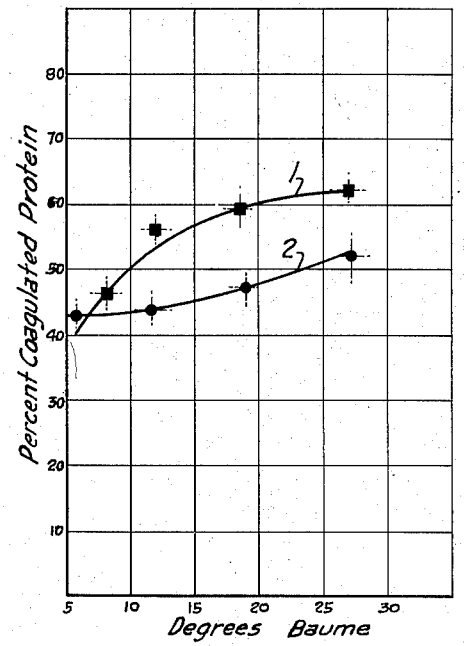
FIG_3_
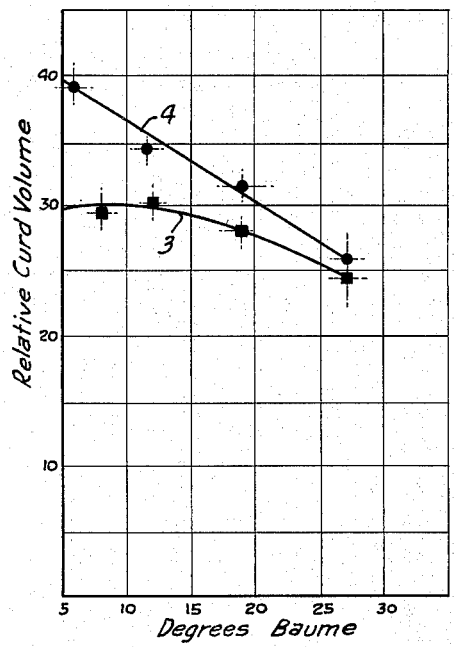
FIG_4_
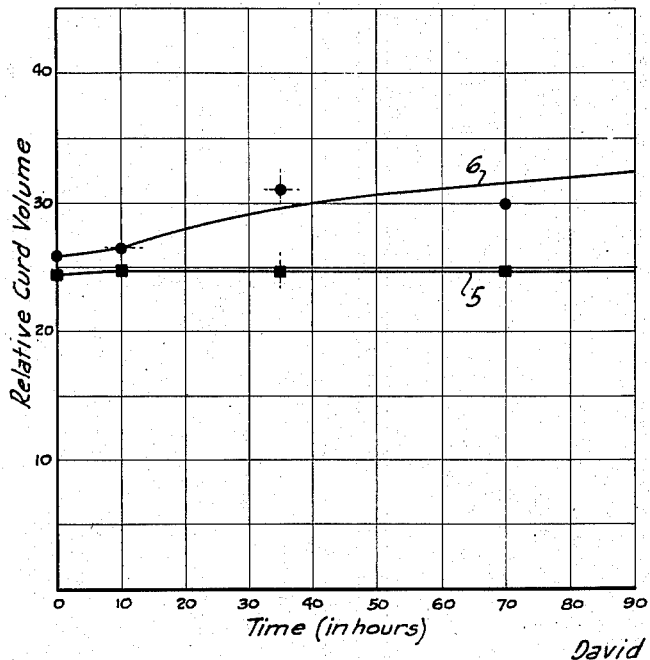
FIG_5_
INVENTORS
David D. Peebles,
Thomas V. Marquis
BY
ATTORNEY Patented Apr. 13, 1948

UNITED STATES PATENT OFFICE 2,439,612

PROCESS FOR MANUFACTURE OF MILK SUGAR

David D. Peebles, Hillsborough, and Thomas V. Marquis, Santa Cruz, Calif., assignors to Western Condensing Company, San Francisco, Calif., a corporation of California Application September 28, 1942, Serial No. 459,920

8 Claims. (Cl. 127—31)

This invention relates generally to processes for the manufacture of milk sugar or lactose from liquid whey.

Conventional processes for the manufacture of lactose from whey are carried out as follows: A portion of the protein of the whey is coagulated by addition of lime and application of heat, or by the addition of other coagulants, after which the coagulated solids together with precipitated calcium phosphate and other insoluble solids are removed by decantation, filtration or centrifuging. The clarified effluent is then concentrated by evaporation, and lactose is crystallized from the concentrate. Lactose is then removed from the mother liquor by centrifuging and further purified by washing. Processes of this character do not produce a lactose as pure as desired or as can be obtained by the present invention, and nutritive constituents of the whey solids, other than the recovered lactose, are seriously impaired or destroyed.

Some lactose has also been manufactured by crystallizing from a concentrate of a lacteal material like skim milk, but without previous removal of proteins. In such a process, however, the proteins of the lacteal fluid are purposely held in solution or a state of colloidal dispersion and remain so during the re-crystallization of the lactose and its subsequent separation. The process has not proven satisfactory (see Fundamentals of Dairy Science; Rogers, 2nd edition, page 129), the difficulties encountered being attributed to contamination of the crystals with protein. According to our observations such a process is impractical because the crystals formed lack such uniformity and size as is required for effective hydraulic separation, centrifuging, and washing.

In another process which has been used to some extent, the coagulable protein is not removed prior to crystallization, but is enzymically degraded to molecularly smaller and less readily coagulable substances in order that crystallization and subsequent operations may take place in a fluid relatively free of insoluble contaminants. Such a process is relatively expensive to carry out commercially, it is critical with respect to pH control, and it requires addition of a chemical like hydrochloric acid which is later neutralized.

It is an object of the present invention to provide a process making possible the manufacture of relatively pure lactose by crystallization from a concentrate, without previous removal of coagulated proteins, and without any treatment to prevent the presence of coagulated protein or other insoluble contaminants during crystallization.

Another object of the invention is to provide a process of the above character having a novel procedure for effectively separating out lactose crystals after the crystallizing operation, and which minimizes the percentage of contaminants removed with the crystals, and also minimizes resolution of lactose.

Another object of the invention is to make possible the preparation of a relatively pure lactose by crystallization from a lacteal concentrate to which no chemicals like mineral acid have been added.

A further object of the invention is to provide a process making possible the manufacture of milk sugar from raw whey, while at the same time affording a valuable food product from the remaining ingredients.

Referring to the drawing:

Figure 1 is a flow sheet illustrating one procedure which can be followed in carrying out the present invention; and Figure 2 is a diagrammatic view showing hydraulic classifying apparatus suitable for use in separating out lactose crystals.

Figures 3, 4 and 5 are curves showing the effect of our special heat treatment.

In carrying out the present process we evaporate whey to produce a concentrate which is supersaturated with respect to its lactose content. By means of special heat treatment the concentrate is caused to have certain properties which we have found to be conducive to the production of relatively large and fast settling lactose crystals in the subsequent crystallizing operation. A part of the lactose is permitted to crystallize out of the concentrate, and this mixture is then submitted to hydraulic classification for removal of the lactose crystals. This last step is preferably aided by diluting the concentrate with a cool diluent like water. Finally the removed lactose can be centrifuged and washed.

The procedure shown in Figure 1 is as follows: A suitable raw liquid material, such as either cheese or casein whey, or a mixture of the two, is preheated at 10 and is then momentarily heated to an elevated temperature at 11. The heating at 11 can be conveniently carried out by direct introduction of live steam into the preheated material, as this material is being pumped to the subsequent evaporating step 12. The temperature to which the material is heated is preferably in excess of 212° F., and a suitable range is from 220 to 260° F. After being abruptly heated to such an elevated temperature by direct contact with the steam, the material immediately proceeds to the evaporating step 12 where the evaporation is preferably carried out under vacuum, in suitable vacuum evaporating equipment. As the material passes to the first evaporating stage, it immediately flashes to a lower temperature below 212° F., and such relatively low temperatures are maintained until evaporation has been carried out to a suitable degree. The heating at 11 is for a short interval, and will not discolor or otherwise detrimentally affect the whey solids.

It is desirable to carry out evaporation until the concentrate contains from, say, 50 to 55% solids. At such concentrations there is a tendency for small crystals of lactose to form in the evaporator. We have found that their presence detrimentally affects the process, presumably because their small particle size prevents properly controlled crystal formation during the crystallization step and hinders subsequent separation, centrifuging and washing. To eliminate such small crystals, we pass the concentrate through a heating step 13, like step 11, and where the concentrate is momentarily heated to an elevated temperature such as from 220 to 260° F. by direct contact with steam. Immediately following such heating, the concentrate can rapidly pass through one or more final stages of evaporation at 14 to cool it to a temperature of the order of 110° F., and to complete evaporation.

Steps 11 and 13 can be carried out by the use of relatively simple equipment. For example, one can make use of a small cylindrical chamber about 14 inches long, and about 3 inches in diameter, with a stream of whey entering one end and leaving the other. Live steam at a pressure above atmospheric is introduced tangentially into the chamber near the point of introduction of the whey. The flow rate through the chamber should be such as to afford only momentary or flash heating to the high temperature, as for example a time period within the chamber of from 2 to 5 seconds. The discharge of this chamber is led by piping directly to the expansion chamber of the vacuum evaporator.

The preheating step 10 is not essential but is desirable in order to avoid too great a dilution by steam condensate in the heat treatment operation 11. Preheating is preferably carried out to a temperature of the order of, say, 180 to 190° F. by use of suitable heating apparatus such as one using heated tubes through which the liquid is rapidly circulated.

The type of vacuum evaporating equipment utilized can vary in practice, although I prefer to utilize equipment of the type disclosed in Peebles et al. Patents Nos. 2,090,985 and 2,168,362. Such equipment is characterized by rapid flow of the material through the evaporating effects, and by the fact that prolonged heat treatment is avoided.

In place of the procedure described above, a single unit of evaporating equipment can be employed with, say, two or more evaporating effects. After the major part of the evaporation has been completed, the concentrate can be passed back through the flash heating operation 11, and then repassed through the evaporating equipment for the operation 14. Also it is feasible to continually recirculate a batch of whey through and in series with the flash heating equipment and evaporating unit, until the degree of concentration desired has been attained. In both of the latter procedures only one piece of equipment is used for the flash heating.

Following production of the concentrate, which is characterized by the absence of lactose crystals, and which contains a particular type of coagulated protein as well as other insoluble matter in a finely divided state, the concentrate is subjected to the crystallizing operation 15. This can be carried out in suitable crystallizing tanks, where the material is permitted to remain for a period of time sufficient to permit the development of lactose crystals. During crystallizing, gentle agitation is desirable, and it is also desirable, but not necessary, to subject the material to gradual cooling. For example, in a typical instance the concentrate may be received in the crystallizing tanks at a temperature of about 110° F., and during crystallization it may be cooled to a temperature of the order of 68° F.

In order to reduce the crystallizing period, and in order to facilitate production of relatively large, fast settling material, it is preferable to seed fresh concentrate with material which has been treated in the crystallizing tanks. Thus at the end of the crystallizing operation, one can remove only a part of the batch of material (such as 25 to 50% of the total mass undergoing crystallization), leaving the remainder to intermix with and seed a succeeding batch of concentrate.

Another procedure which can be used for the crystallizing operation is as follows: An initial batch of concentrate is crystallized over a suitable period such as 24 hours. Without removing any of the initial batch, it is mixed with the next batch of concentrate, and the combined material is further crystallized for a like period. A third batch of concentrate is then added and crystallization continued as with the second batch. Further additions of concentrate can be made, depending upon the tankage capacity.

The material removed from the crystallizing operation is diluted at 16, preferably with relatively cool water. For example, assuming that the material being withdrawn from the crystallizing tanks is at a temperature of the order of 68° F., the water used for dilution is preferably relatively colder, as for example a temperature of 60° F., or lower. The extent of the dilution may vary, although in a typical instance from 25 to 50 gallons of water can be used to dilute 100 gallons of concentrate, depending upon the nature of the concentrate. In place of plain water, other aqueous materials can be used, such as whey. Dilution in this fashion serves the useful purpose of reducing the viscosity of the material, as well as reducing its density, thus putting the material in better condition for subsequent separation of the lactose. Dilution may not be important under certain ideal conditions, that is with relatively low viscosity and exceptionally large crystals. However, such ideal conditions can be obtained only in rare instances.

The separating operation 17 upon the diluted material should remove the lactose crystals from contaminants and mother liquor without serious re-solution. It will be noted that because of dilution, the liquid is not saturated with respect to its dissolved lactose content, and therefore re-solution of the crystallized lactose can occur. The rate of solution of lactose as well as its solubility decreases with decrease in temperature, and therefore use of cold diluting water lowers the temperature of the material and tends to minimize re-solution in the separating operation.

Various types of separating methods can be used for removal of the lactose, although hydraulic classification is preferred. One desirable form of apparatus for carrying out hydraulic classification will be presently described.

The lactose crystals removed by hydraulic separation carry a minimum of proteins and other contaminants, and they can be directly subjected to centrifuging at 18. During centrifuging, the lactose is subjected to washing with fresh water for further purification. The lactose as finally removed from the basket of the centrifuge contains from about 3 to 10% moisture and can be subjected to drying at 19 to produce the final dried product.

The effluent from the separating operation 17 contains valuable food ingredients, including water soluble vitamins like riboflavin and other members of the vitamin B complex, and is utilized to form a saleable by-product. Thus the overflow from the separation operation 17 is shown being subjected to drying at 20 to produce a final dried product. Such a material is useful as an ingredient in stock or poultry feed.

Figure 2 diagrammatically shows a desirable apparatus for carrying out the diluting and separating steps 16 and 17. This equipment includes a classifying cone 21 having an inlet pipe 22, an overflow launder 23, and an outlet pipe 24. Pipe 26 connects with pipe 22 for introducing cold water, and the discharge end of pipe 22 is surrounded by the collar 27. The bottom of the cone is provided with a discharge opening normally closed by the hinged trap door 29.

In operating the apparatus of Figure 2 and to carry out our preferred process, concentrate entering pipe 22 is diluted with cold water or whey, and as the diluted material enters the cone, lactose crystals settle out and collect as a bed in the lower part of the cone. From time to time door 29 is opened to withdraw lactose from the bottom of the bed, or if desired the cone may be completely filled with lactose crystals, the residual effluent containing contaminants drained off, and the entire batch of crystals dropped into a suitable tank. The material is then taken from this tank for centrifuging and washing. The overflow carries off substantially all of the remaining solids, including the finely divided coagulated protein. With apparatus of this character, re-solution of the lactose is maintained at a minimum, particularly because as the lactose settles to the lower bed of crystals, it is immediately covered and protected against re-solution by subsequently settling solids, and because the quiescent liquid in that part of the cone occupied by the collected bed of crystals assumes a condition of saturation with respect to lactose in solution.

A particular feature of the above process is the special conditioning of the concentrate used for the crystallizing operation, to make possible relatively large crystals of lactose, having a high settling rate and capable of being handled without difficulty in a centrifuge. If a whey concentrate containing 50% to 55% solids were prepared by ordinary vacuum evaporation, with or without preheating as previously described, and if one then attempted to crystallize out lactose from a concentrate obtained in this manner, the lactose crystals would lack uniformity as to size and a substantial part of the crystals would be so small that they could not be readily separated out, centrifuged, and washed. We have found that this is due to a substantial degree to the relatively high viscosity of such a concentrate, which in turn is caused to a substantial degree by the presence of partially coagulated protein particles, which have considerable water of hydration and which increase the viscosity of the concentrate because of their jell-like character. When whey is concentrated by ordinary vacuum evaporation to from 50% to 55% solids, only about 50% to 52% of the protein is coagulated and the protein particles are caused to have a relatively large curd volume. Our special heat treatment, by momentary heating to a high temperature, serves to irreversibly coagulate substantially all of the protein which is readily susceptible to coagulation by heat treatment, namely to the extent of about 60% to 62% of the total protein content.

By irreversible coagulation we have reference to such denaturing of the coagulated protein that the protein particles do not subsequently imbibe water or hydrate to enlarge their relative curd volume. During such denaturing there is a substantial shrinkage in the particle size of the protein, and this shrinkage is accompanied by a loss of water of hydration.

The curves shown by Figures 3, 4 and 5 serve to illustrate the effect of the special heat treatment. In Figure 3 curve 1 represents the extent of coagulation of protein as concentration proceeds, using a single vacuum evaporation unit in series with a high temperature flash heater as previously explained. Curve 2 represents the extent of protein coagulation where the whey is simply pre-heated to about 180° F. and then concentrated by vacuum evaporation at treatment temperatures of the order from 125 to 130° F. Note that at about 27 Bé., corresponding to about 52% solids, the percentage of coagulation shown by curve 1 is about 62%, while it is only about 52% for curve 2. According to our observation it is impossible to coagulate more than about 65% of the whey nitrogen as protein, by heat treatment. The uncoagulated protein remains in soluble form. Curves 3 and 4 in Figure 4 show the relative curd volume for the coagulated protein in the concentrates corresponding to curves 1 and 2. Note that at about 27 Bé. the curd volume of the coagulated protein (curve 3) obtained by use of the momentary high temperature treatment is substantially less than the curd volume of protein obtained by ordinary evaporation (curve 4). This means that for a given concentration the whey made by the present process has a substantially lower viscosity than concentrate made by ordinary evaporation, by virtue of the smaller curd volume of the coagulated protein.

Figure 5 shows the effect of the heat treatment upon the water imbibing properties of the coagulated protein. Curve 5 of this figure shows how the coagulated protein of whey prepared by our process does not imbibe water to any appreciable extent upon prolonged holding, while curve 6 shows that the coagulated protein corresponding to curve 4 does imbibe water to a substantial degree upon prolonged holding. The effect of this would be to increase the viscosity of the concentrate during the prolonged holding period which occurs in the crystallizing operation, while on the contrary with the irreversible coagulated protein obtained by our process, the viscosity imparted by the protein remains constant while the lactose is being crystallized, thus promoting the production of large-size and uniform lactose crystals as previously described.

A low viscosity for the concentrate is also desirable in that it aids evaporation to the concentration desired, particularly in that an increase in viscosity tends to make handling in a vacuum evaporator more difficult and the evaporating cycle less efficient.

In a typical instance the whey introduced into the process had about 6.05% solids, and the solids analyzed substantially as follows:

| | Per cent |
|---|---|
| Acid (as lactic) | 5.6 |
| Lactose (monohydrate) | 67.0 |
| Protein | 14.3 |
| Ash | 10.0 |
| Undetermined | 3.1 |

At the end of the crystallizing operation, from a 52% solids concentrate, the material contained about 19.0% of crystallized lactose. Of the total lactose content of the original whey, about 35% was removed from the lower end of the classifier, and about 34% remained after washing and centrifuging. The feed product made by drying the overflow contained about 76.6% of the total solids in the original whey.

The lactose after centrifuging and drying analyzed as follows:

| | Per cent |
|---|---|
| Moisture | 0.03 |
| Protein | 0.49 |
| Ash | 0.22 |
| Acid | 0.09 |
| Lactose | 99.17 |

The dry feed material made by drying the overflow from the classifier analyzed as follows:

| | Per cent |
|---|---|
| Lactose | 57.5 |
| Acid | 7.3 |
| Protein | 18.7 |
| Ash | 13.0 |
| Undetermined | 3.5 |

It will be apparent that the products obtained will vary in analysis from time to time, depending upon various factors such as the character of the raw whey employed, the precise procedure employed in carrying out concentration and crystallization, and the extent of re-solution permitted in separating the lactose. The figures cited above by way of example demonstrate the high degree of purity made possible by the process.

In the foregoing reference has been made to use of ordinary liquid whey such as is obtained in the manufacture of cheese or casein. The process is also applicable to other lactose containing lacteal fluids, such as a material prepared by mixing dry powdered whey with water. Such a reconstituted whey can be treated as previously described, with modification of the evaporating operation in accordance with the solids content of the reconstituted material.

We claim:

1. In a process for the manufacture of lactose from a liquid lacteal material containing milk protein and lactose, subjecting the material to evaporation and heat treatment to form a concentrate which is supersaturated with respect to its lactose content, which has the major part of its protein content irreversibly coagulated by heat and which is free of lactose crystals, the heat treatment including directly contacting the material with steam to rapidly transfer heat to the same, seeding a mass of said concentrate with lactose crystals formed in a preceding crystallizing operation of the process, permitting lactose from the concentrate to crystallize out in the mass after such seeding, and then separating out lactose crystals from the mass of material.

2. In a process for the manufacture of lactose, the steps of forming a lacteal concentrate supersaturated with respect to its lactose content and containing coagulated milk protein, causing a substantial amount of the lactose content to crystallize out of solution, diluting the concentrate with water which is relatively cool compared to the concentrate being diluted, the amount of diluting water being sufficient to effect a substantial reduction in viscosity and the temperature of the diluting water being sufficiently low to minimize resolution of lactose upon dilution, and immediately thereafter removing lactose crystals from the diluted material by hydraulic classification.

3. In a process for the manufacture of lactose from whey, the steps of concentrating whey by evaporation to form a supersaturated solution of lactose, permitting a substantial amount of the lactose content to crystallize out from the solution, adding water to the bulk of the material containing the crystals to an amount sufficient to effect a substantial reduction in viscosity, the water being relatively cool compared to the concentrate being diluted to minimize resolution of lactose in the diluted mass, and then removing lactose crystals from the diluted material by hydraulic classification.

4. In a process for the manufacture of lactose from lacteal material containing milk protein and lactose, subjecting the material to evaporation and heat treatment to form a concentrate supersaturated with respect to its lactose content and completely free from lactose crystals, the major part of the protein concentrate being irreversibly coagulated, seeding a mass of the concentrate with lactose crystals formed in a previous crystallizing operation of the process, permitting lactose crystals to form in the seeded mass, diluting the mass of material with water in an amount sufficient to effect a substantial reduction in viscosity, said water being cool compared to the temperature of the mass being diluted to minimize resolution of lactose in the diluted mass, and then separating out lactose crystals from the diluted material.

5. In a process for the manufacture of lactose from lacteal material containing milk protein and lactose, subjecting the material to vacuum evaporation to form a concentrate supersaturated with respect to its lactose content, flash heating the concentrate at about the completion of evaporation to a temperature and for a period of time sufficient to cause complete resolution of lactose crystals formed during previous vacuum evaporation, cooling the concentrate after such heating without crystallization of lactose, seeding a mass of the concentrate with lactose crystals, permitting lactose crystals to form in the seeded mass, and then separating out lactose crystals from the mass of material.

6. In a process for the manufacture of lactose from a liquid lacteal material containing milk protein and lactose, subjecting the material to vacuum evaporation and heat treatment to form a concentrate which is supersaturated with respect to its lactose content, which has the major part of its protein content irreversibly coagulated by heat and which is free of lactose crystals, the heat treatment including flash heating of the material to a temperature in excess of about 212° F. for a period of time sufficient to irreversibly coagulate the majority of the whey protein but insufficient to cause material discoloration of whey solids, seeding a mass of said concentrate with lactose crystals formed in a preceding crystallizing operation of the process, permitting lactose from the concentrate to crystallize out in the mass after such seeding, and then separating out lactose crystals from the mass of material.

7. In a process for the manufacture of lactose from whey, the steps of concentrating whey by evaporation to form a concentrate supersaturated with respect to its lactose content, seeding a mass of the concentrate with lactose crystals, permitting lactose crystals to form in the seeded mass, diluting the mass of material with water in an amount sufficient to effect a substantial reduction in viscosity, and then subjecting the resulting mass to hydraulic separation to effect separation of lactose crystals, said last named step being conducted by continually supplying the diluted mass to the upper portion of a liquid separating column, continually withdrawing an overflow consisting of liquid and unseparated crystals from the upper portion of the column, and permitting the lactose crystals to separate out into the lower quiescent portion of the column.

8. In a process for the manufacture of lactose from whey, the steps of concentrating whey by evaporation to form a concentrate supersaturated with respect to its lactose content, seeding a mass of the concentrate with lactose crystals, permitting lactose crystals to form in the seeded mass, diluting the mass of material with water in an amount sufficient to effect a substantial reduction in viscosity, said water being at a temperature sufficiently low relative to the temperature of the concentrate to substantially reduce the temperature of the resulting diluted mass to thereby minimize resolution of lactose crystals, and then effecting hydraulic separation of lactose crystals from the diluted material, said last named step being conducted by supplying the diluted mass to the upper portion of a liquid separating column, establishing an overflow of liquid from the upper portion of the column together with unseparated crystals, and permitting lactose crystals to separate out into a lower quiescent portion of the column.

DAVID D. PEEBLES.
THOMAS V. MARQUIS.

REFERENCES CITED

The following references are of record in the file of this patent:

UNITED STATES PATENTS

| Number | Name | Date |
|---|---|---|
| 193,436 | Witte | July 24, 1877 |
| 648,490 | Graeff | May 1, 1900 |
| 1,600,573 | Bell | Sept. 21, 1926 |
| 1,952,017 | Leighton | Mar. 20, 1934 |
| 2,116,931 | Leviton | May 10, 1938 |
| 2,181,146 | Peebles et al. | Nov. 28, 1939 |